(12) United States Patent
Sato (10) Patent No.: US 6,426,777 B1
(45) Date of Patent: Jul. 30, 2002

(54) HYBRID CAMERA SELECTIVELY USING EITHER SILVER-HALIDE-TYPE PHOTOGRAPHIC FILM OR PHOTOELECTRIC-CONVERSION-TYPE IMAGE SENSOR

(75) Inventor: Koichi Sato, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/050,987

(22) Filed: Mar. 31, 1998

(30) Foreign Application Priority Data

Apr. 3, 1997 (JP) .............................................. 9-101026

(51) Int. Cl.[7] .............................................. H04N 5/225
(52) U.S. Cl. ........................ 348/373; 348/64; 396/429
(58) Field of Search ................................ 348/207, 373, 348/374, 375, 376, 64; 358/906, 909.1; 396/419, 429, 428, 322

(56) References Cited

U.S. PATENT DOCUMENTS 4,716,470 A * 12/1987 Levine ....................... 348/373
5,689,742 A * 11/1997 Chamberlain, IV ......... 348/333
5,940,121 A * 8/1999 Mcintyre et al. .............. 348/64
5,978,016 A * 11/1999 Lourette et al. ............... 348/64
6,181,883 B1 * 1/2001 Oswal ......................... 396/429

FOREIGN PATENT DOCUMENTS

JP            2101874          4/1990

* cited by examiner

Primary Examiner—Wendy R. Garber
Assistant Examiner—Aung S. Moe
(74) Attorney, Agent, or Firm—Greenblum & Bernstein, P.L.C.

(57) ABSTRACT

A hybrid camera selectively uses either a photographic film or a CCD image sensor to record an optical objective image, obtained through a photographing optical system. A movable assembly is shiftable along an optical axis of the optical system, between a first photographing position and a second photographing position, and carries the film and the image sensor. A driver selectively drives the assembly so as to be positioned at either the first position or the second position. When the assembly is positioned at the first position by the driver, an imaging area of the film is placed on an image-forming plane, defined by the optical system. When the assembly is positioned at the second position by the driver, an image-sensing area of the image sensor is placed on the image-forming plane.

11 Claims, 8 Drawing Sheets

←— BACK-FOCUS DISTANCE —→

(b)

IMAGE-FORMING PLANE

FIG.5

IMAGE-FORMING PLANE

HYBRID CAMERA SELECTIVELY USING EITHER SILVER-HALIDE-TYPE PHOTOGRAPHIC FILM OR PHOTOELECTRIC-CONVERSION-TYPE IMAGE SENSOR

BACKGROUND OF THE INVENTION

1. Field of the Invention

The present invention relates to a hybrid camera, which can selectively use either a silver-halide-type photographic film or a photoelectric-conversion-type image sensor to record an optical objective image, obtained through a photographing optical system, thereon.

2. Description of the Related Art

Recently, an electronic still video camera, which includes a photographing optical system for forming an optical objective image, a photoelectric-conversion-type image sensor, such as a CCD (charge-coupled device) image sensor, for converting the optical objective image into a frame of image-pixel signals, and a memory medium, such as an IC memory card, a floppy disk and so on, for storing the frame of image-pixel signal in the memory medium, has become popular.

On the other hand, a hybrid camera, which can selectively use either a silver-halide-type photographic film or a photoelectric-conversion-type image sensor to record an incident optical objective image, obtained through a photographing optical system, has been developed. In a hybrid camera, usually either a pressure-plate unit or an image sensor unit is detachably assembled in an inner space of a releasable back-cover of a camera body, allowing the two units to be selectively interchangeable with each other. The pressure-plate unit includes a resiliently-biased plate element, and the image sensor unit includes a photoelectric-conversion-type image sensor, such as a CCD image sensor.

When a hybrid camera is used as a conventional camera, i.e. when a hybrid camera is charged with a film cartridge containing a roll of silver-halide-type photographic film, the pressure-plate unit is initially assembled in the inner space of the releasable back-cover, so that a frame section of the silver-halide-type photographic film is exactly positioned on an image-forming plane, defined by a photographic optical system, by the resiliently-biased plate element of the pressure-plate unit.

When the hybrid camera is used as an electronic still video camera, the pressure-plate unit is exchanged for the CCD image sensor unit. Namely, the image sensor unit is assembled in the inner space of the releasable back-cover. When the back-cover is closed, an image-sensing surface of the CCD image sensor is positioned on the image-forming plane of the photographing optical system, and thus an optical image to be photographed is formed and correctly focused on the image-sensing surface of the CCD image sensor.

As is apparent from the foregoing, in a conventional hybrid camera, whenever one of the two functions is selected in place of the other, the pressure-plate unit and the image-sensor unit must be interchanged. Of course, the interchanging of the units is time consuming and troublesome for the user.

SUMMARY OF THE INVENTION

Therefore, an object of the present invention is to provide a hybrid camera, selectively using either a silver-halide-type photographic film or a photoelectric-conversion-type image sensor to record an incident optical objective image, obtained through a photographing optical system, wherein a recording of the optical image on one of the photographic film and the image sensor can be automatically and reliably selected without involving any burdensome manual manipulation.

In accordance with the present invention, there is provided a hybrid camera selectively using either a photographic film or a photoelectric-conversion-type image sensor to record an incident optical objective image, obtained through a photographing optical system. The hybrid camera comprises a movable assembly, which is shiftable along an optical axis, defined by the photographing optical system, between a first photographing position and a second photographing position. The photographic film and the photoelectric-conversion-type image sensor are mounted on the movable assembly. The hybrid camera further comprises a driver, which selectively drives the movable assembly, such that the movable assembly is positioned at either the first photographing position or the second photographing position. When the movable assembly is positioned at the first photographing position by the driver, an image-recording area of the photographic film is placed on an image-forming plane, defined by the photographing optical system. When the movable assembly is positioned at the second photographing position by the driver, an image-sensing area of the photoelectric-conversion-type image sensor is placed on the image-forming sensor of the photographing optical system.

Preferably, the movable assembly includes a constrainer for constraining the movement of the photographic film at a given location with respect to the movable assembly, and a transparent pressure-plate, a surface of which the constrained photographic film is placed against. The movable assembly may comprise a first subassembly and a second subassembly which are associated with each other. In this case, the constrainer is included in the first subassembly, and the transparent pressure-plate is included in the second subassembly. Also, the image-sensing area of the photoelectric-conversion-type image sensor is in contact with a second surface, being opposite the first surface, of the transparent pressure-plate. The transparent pressure-plate is preferably formed of a transparent glass material exhibiting an infrared-radiation-shielding characteristic.

The hybrid camera may further comprise a first resilient device for resiliently biasing the first subassembly against the second subassembly, and a second resilient device for resiliently biasing the second subassembly against the first subassembly, whereby the photographic film is resiliently pressed against the first surface of the transparent pressure-plate. Preferably, an urging force of the first resilient device is smaller than an urging force of the second resilient device, such that a resultant urging force resiliently biases the movable assembly toward the second photographing position, whereby the positioning of the movable assembly at the second photographing position by the driver is assisted by the second resilient device.

Also, the hybrid camera may comprise a film sensor for sensing an existence of the photographic film. In this case, the movable assembly, driven by the driver, is positioned at the first photographing position, when the existence of the photographic film is sensed by the film sensor, and the movable assembly, driven by the driver, is positioned at the second photographing position, when the existence of the photographic film is not sensed by the film sensor.

Further, the hybrid camera may comprise a determiner for determining whether the movable assembly is properly positioned at either the first photographing position or the second photographing position. In this case, a photographing operation is disabled when it is determined by the determiner that the positioning of the movable assembly at either the first photographing position or the second photographing position is irregular. Preferably, the hybrid camera comprises a display device for displaying a message, which announces that the photographing operation is prohibited, when the photographing operation has been disabled.

The driver may comprise at least one solenoid actuator, having a plunger associated with the movable assembly. The plunger of the solenoid actuator is selectively driven between a first operative position and a second operative position. In this case, the movable assembly is positioned at the first photographing position when the plunger is at the first operative position, and the movable assembly is positioned at the second photographing position when the plunger is at the second operative position.

BRIEF DESCRIPTION OF THE DRAWINGS

These objects and other objects of the present invention will be better understood from the following description, with reference to the accompanying drawings, in which.

DESCRIPTION OF THE PREFERRED EMBODIMENTS

Figure 1:
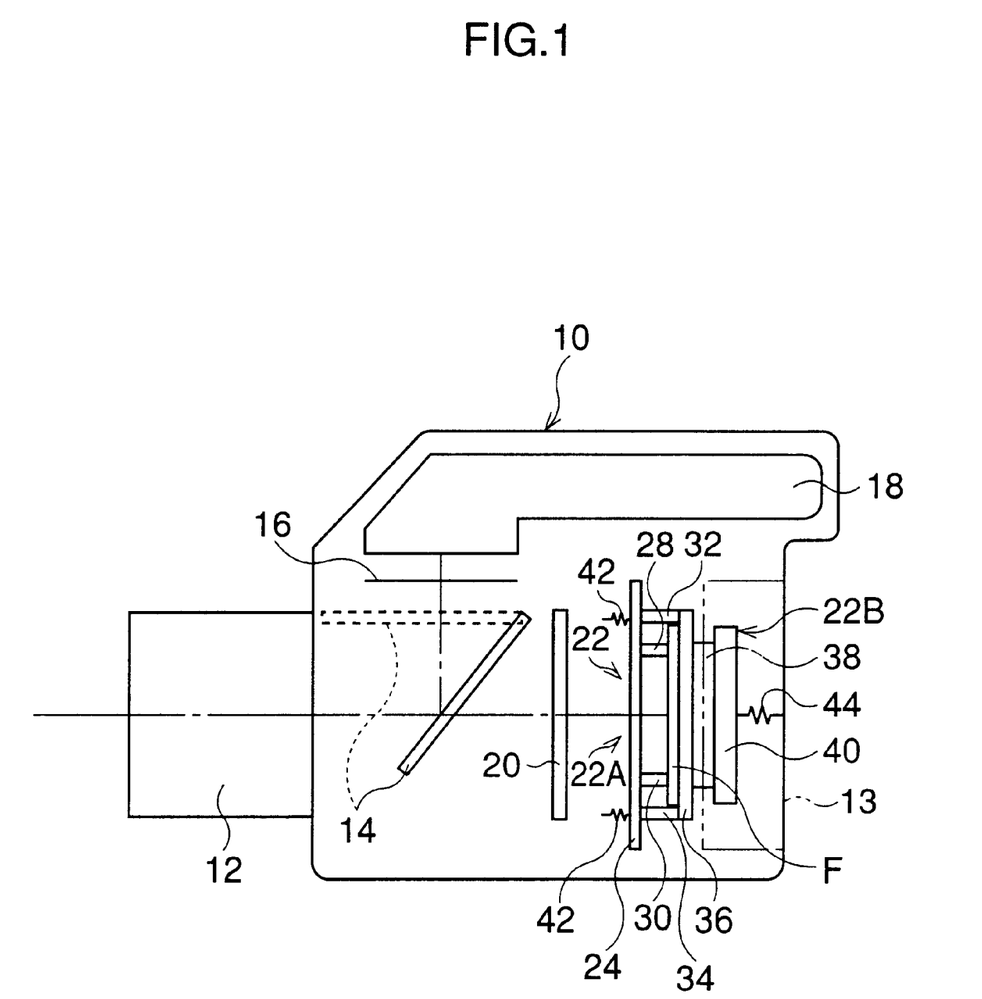
FIG. 1 is a schematic view showing a hybrid camera according to the present invention.

FIG. 1 shows an inner schematic arrangement of a hybrid camera, according to the present invention, which is constituted as a single-lens reflex-type camera. The hybrid camera comprises a camera body, generally designated by reference 10, and a lens barrel 12 detachably mounted on the camera body 10 and having a photographing optical system disposed therein. Attached to a rear side of the camera body 10, is a releasable back-cover 13, a profile of a part of the back-cover 13 being shown by a phantom line in FIG. 1.

The hybrid camera also comprises a quick return mirror 14 provided in the camera body 10 and spaced to the rear of the lens barrel 12, a focusing glass 16 disposed above the quick return mirror 14, a viewfinder 18 provided on the top of the camera body 10, and a shutter 20 positioned at the rear side of the quick return mirror 14. Note, the focusing glass 16 is included in an optical system of the viewfinder 18

As shown in FIG. 1, the quick return mirror 14 is moved between a down-position (i.e. the inclined position shown by the solid lines) and an up-position (i.e. the horizontal position shown by the broken line). The quick return mirror 14 is usually in the down-position or the inclined position, and thus light beams, passing through the photographing optical system (12), are directed to and focused on the focusing glass 16 of the optical system of the viewfinder 18, so that an optical objective image to be photographed can be observed through the viewfinder 18 by a photographer. Note, the movement of the quick return mirror 14 may be controlled in any well-known manner, and is thus not discussed herein.

When a photographing operation is executed, the quick return mirror 14 is rotated upward, being then in the up-position, so that the light beams, passing through the photographing optical system, are directed to the shutter 20. The shutter 20 is subsequently opened for a given period of time, to allows formation of the optical objective image on a recording medium. Note, the opening of the shutter 20 may also be controlled in any well-known manner, and thus is not discussed herein.

The hybrid camera further comprises a movable assembly 22 provided at the rear side of the shutter 20. The movable assembly 22 can be shifted forward and rearward along an optical axis defined by the photographing optical system (12). The movable assembly 22 comprises a first subassembly 22A provided in the camera body 10, and a second subassembly 22B held by the releasable back-cover 13. The first subassembly 22A may be guided by guide-elements (not shown) suitably arranged in the camera body 10, and the second assembly 22B may also be guided by guide-elements (not shown) suitably arranged in the inner space of the releasable back-cover 13.

Figure 2:
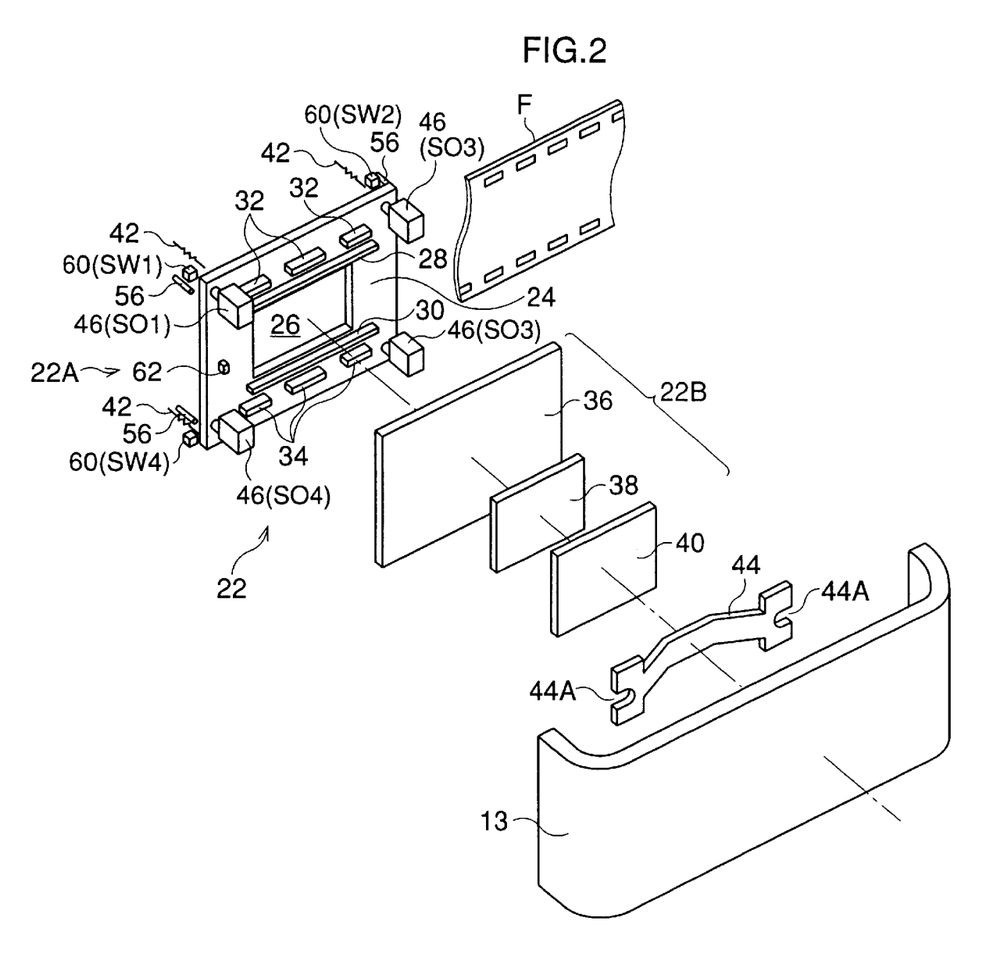
FIG. 2 is an exploded perspective view showing main elements of the hybrid camera.

As best shown in FIG. 2, the first subassembly 22A includes a rectangular frame member 24, having a rectangular opening 26 formed in a central area thereof, the rectangular opening 26 defining an exposure area during a photographing operation. The first subassembly 22A also includes a pair of upper and lower guide rail elements 28 and 30, securely attached to a rear surface of the rectangular frame member 24 and extending along the upper and lower edge sides of the rectangular opening 26. The first subassembly 22A further includes three guide piece elements 32, securely attached to the rear surface of the frame member 24, disposed along the upper side of the guide rail 28, and three guide piece elements 34, securely attached to the rear surface of the frame member 24, disposed along the lower side of the lower guide rail 30.

As best shown in FIG. 1, the upper and lower guide rails 28 and 30 have the same width, and the guide piece elements 32 and 34 have the same width. Also, the width of the upper and lower guide rails 28 and 30 is smaller than that of the guide piece elements 32 and 34, and thus the guide piece elements 32 and 34 further protrude from the rear surface of the frame member 24 than the upper and lower guide rails 28 and 30.

A film cartridge (not shown), having a roll of silver-halide photographic film, is accommodated in a side location of the camera body 10 by releasing the back-cover 13 in a conventional manner. The silver-halide photographic film, indicated by reference F in FIGS. 1 and 2, is pulled out of the film cartridge, and is wound by a winder spool (not shown) provided in the camera body 10, opposite to the location of the film cartridge. The upper rail 28, associated with the three guide piece elements 32, and the lower guide rail 30, associated with the three guide piece elements 34, operate in conjunction with each other to constrain the photographic film F, as shown in FIG. 1. Namely, after the back-cover 13 is closed, the photographic film F can be wound by the winder spool frame by frame, and, during the winding, the photographic film F is moved along a guide path defined by the upper rail 28, associated with the three guide piece elements 32, and the lower guide rail 30, associated with the three guide piece elements 34.

The second subassembly 22B includes a transparent pressure-plate 36 formed of a suitable transparent glass material, a photoelectric-conversion-type image sensor, for example, a CCD (charge-coupled device) image sensor 38, attached to a rear surface of the transparent pressure-plate, and a control circuit board 40 integrally formed with the CCD image sensor 38 to operate it. Preferably, the transparent glass material for the pressure-plate 36 exhibits an infrared radiation shielding characteristic. The attachment of the CCD image sensor 38 to the pressure-plate 36 is performed such that an image-sensing area or light-receiving area of the CCD image sensor 38 is covered with the pressure-plate 36.

As is apparent from FIGS. 1 and 2, four compressed coil springs 42 are provided in the camera body 10, and are arranged at the four corner areas of the rectangular frame member 24, on a front side thereof. Note, in FIG. 2, one of the four compressed coil springs 42 is not visible due to the existence of the rectangular frame member 24. The compressed coil springs 24 are constrainedly interposed between the rectangular frame member 24 and a chassis (not shown) in the camera body 10, and thus the first subassembly 22A is resiliently biased against the second subassembly 22B.

Conversely, a leaf spring 44, provided between the back-cover 13 and the control circuit board 40 has two recesses 44A formed in the ends thereof. Note, in FIG. 1, the leaf spring 44 is symbolically illustrated. A pair of pin elements (not visible) are provided on an inner surface of the back-cover 13, and the leaf spring 44 is constrainedly interposed between the pin elements such that the respective pin elements are received in the recesses 44A of the leaf spring 44. As shown in FIG. 2, the leaf spring 44 is curved, such that the second subassembly 22B is resiliently biased against the first subassembly 22A.

Namely, the first and second subassemblies 22A and 22B are resiliently biased against each other, with the photographic film F, being interposed between the two subassemblies 22A and 22B, placed on a front surface of the transparent pressure-plate 36. An urging force, obtained from the four compressed coil springs 42, is smaller than an urging force of the leaf spring 44, and thus the movable assembly 22, comprising the first and second subassemblies 22A and 22B, is always subjected to a resultant urging force, generating a resilient bias toward the lens barrel 10.

As shown in FIG. 2, four solenoid actuators (SO1, SO2, SO3 and SO4) 46 are provided in the camera body 10, and are arranged at the four corner areas of the rectangular frame member 24, on the rear side thereof. As shown in detail in FIG. 3, each of the solenoid actuators 46 includes a cylinder housing 48, a permanent magnet 50 provided in the cylinder housing 48, a plunger 52 provided in the cylinder housing 48 and movable along a central axis of the cylinder housing 48, and a solenoid 54 surrounding the plunger 52. The cylinder housing 48 is supported by the chassis in the camera body 10, and an outer end of the plunger 52 is securely connected to the rectangular frame member 24.

Figure 3:
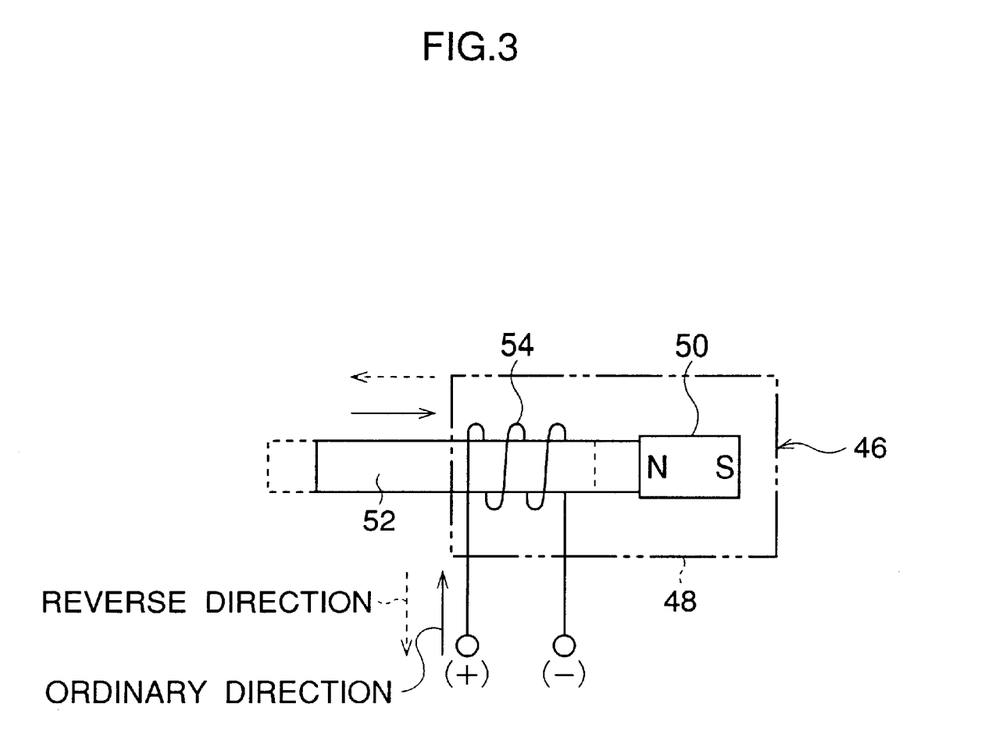
FIG. 3 is a schematic view representatively showing one of four solenoid actuators included in the hybrid camera.

The plunger 52 is formed of a suitable magnetic material, and operates in conjunction with the permanent magnet 50. As shown in FIG. 3, an inner end face of the plunger 52 faces the N pole of the permanent magnet 50, and the plunger 52 is moved between a retracted position, shown by a solid line, and a projected position, shown by a broken line. The plunger 52 is positioned at either the retracted position or the projected position, in accordance with a direction of electric current flowing through the solenoid 54.

Namely, when the electric current flows through the solenoid 54, in a direction indicated by a solid arrow in FIG. 3, the inner end of the plunger 52 serves as the S pole, enabling the permanent magnet 50 to magnetically attract plunger 52, whereby the plunger 52 is positioned at the retracted position. Thereafter, although the application of the electric current to the solenoid 54 is halted, the plunger 52 remains at the retracted position, because the magnetic attraction of the plunger 52 to the permanent magnet 50 is maintained. On the other hand, when the electric current flows in reverse through the solenoid 54, in a direction indicated by a broken arrow, the inner end of the plunger 52 serves as the N pole, and the plunger 52 is magnetically repulsed from the permanent magnet 50 whereby the plunger 52 is moved from the retracted position to the projected position.

Note, for the sake of convenience of explanation, the respective directions, indicated by the solid arrow and the broken arrow in Fig, 3, are referred to as an ordinary direction and a reverse direction, respectively, hereinafter.

Again, with reference to FIG. 2, four positioning pins 56 are provided in the camera body 10, and are arranged adjacent to the four corners of the rectangular frame member 24, on the front side thereof. Note, one of the positioning pins 56 is not visible due to the existence of the rectangular frame member 24. Each of the positioning pins 56 is supported by the chassis in the camera body 10.

The solenoid actuators 46 operate in conjunction with the compressed coil springs 42, the leaf spring 44 and the positioning pins 56, so that the movable assembly 22 is positioned at either a first photographing position or a second photographing position, as stated below with reference to FIGS. 4 and 5.

Figure 4:
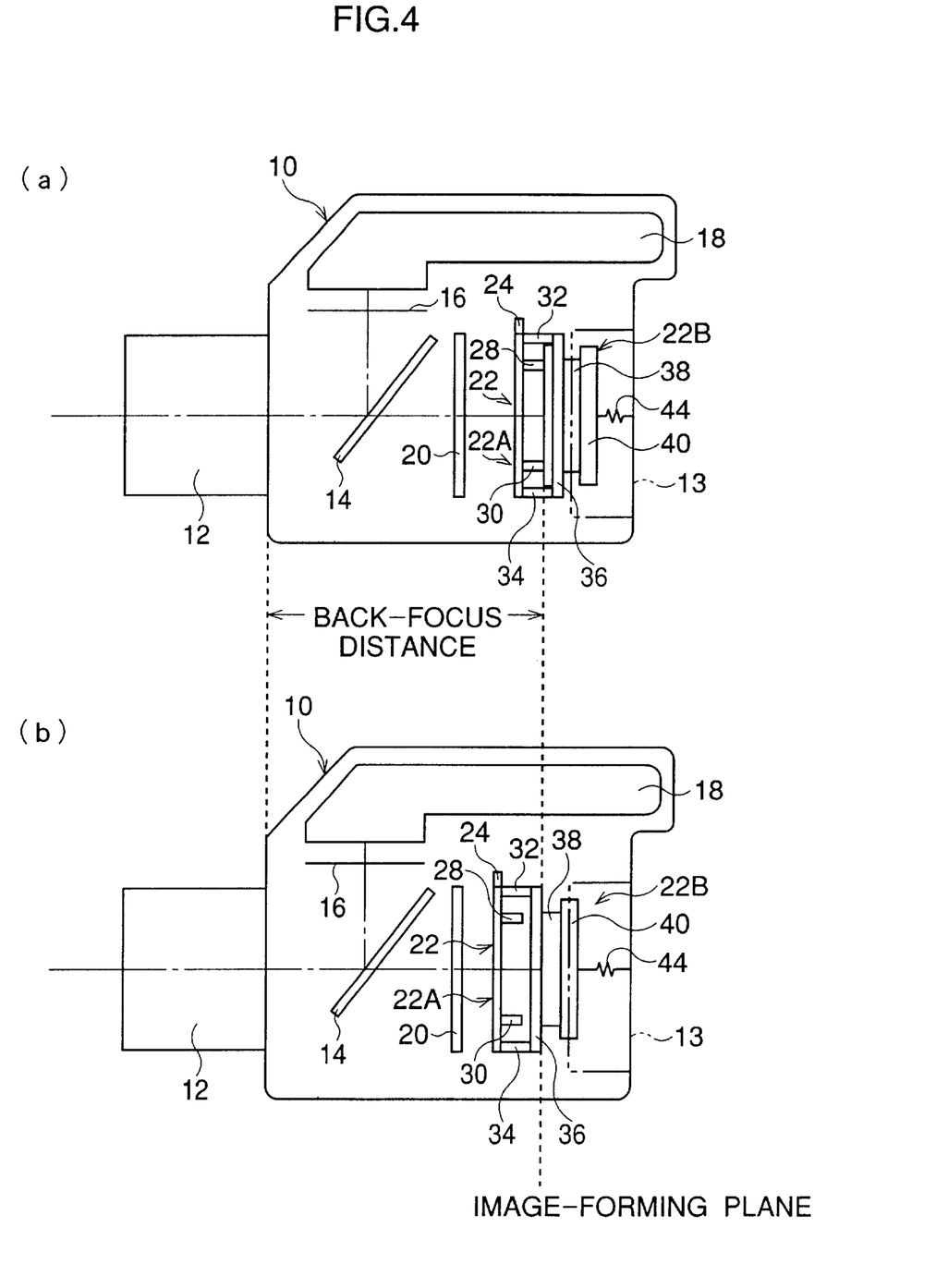
FIGS. 4(a) and 4(b) are schematic views showing the hybrid camera in two different statuses for the purpose of comparison.

Note, in the hybrid camera shown in an upper half (a) of FIG. 4, the movable assembly 22 is at the first photographing position, and, in the hybrid camera shown in a lower half (b) of FIG. 4, the movable assembly 22 is at the second photographing position. Also, note, the respective upper and lower halves (a) and (b) of FIG. 4 correspond to upper and lower halves (a) and (b) of FIG. 5, in which partial enlargements of the main elements of the hybrid camera are shown. Further note, in FIG. 5, a part of the chassis, by which the solenoid actuator 46 is supported, is designated by reference numeral 58.

Figure 5:
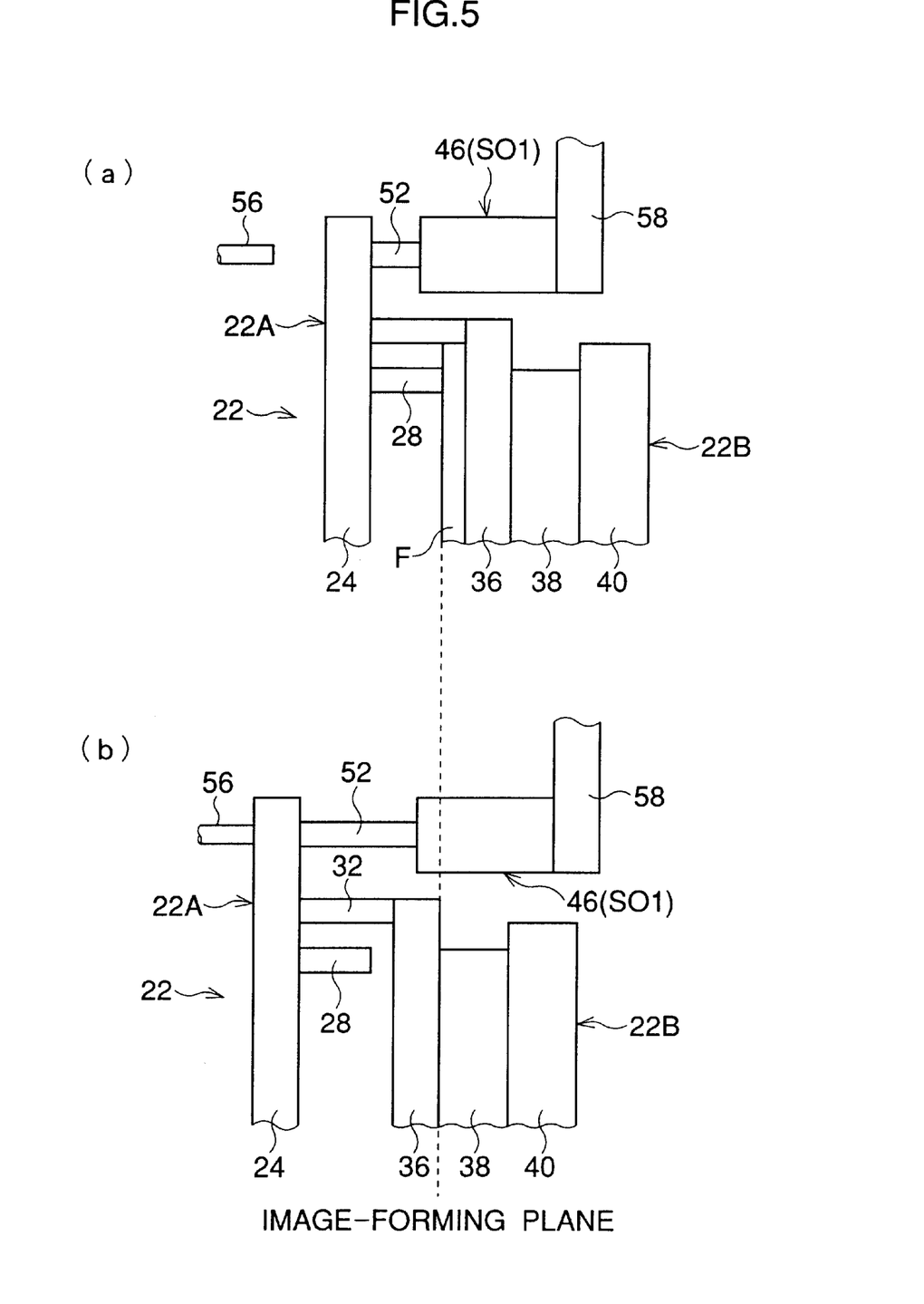
FIGS. 5(a) and 5(b) are enlarged views, corresponding to FIGS. 4(a) and 4(b) partially showing the main elements of the hybrid camera, shown in FIGS. 4(a) and 4(b)

In the upper half (a) of FIG. 5, the plunger 52 of each solenoid actuator 46 is at the retracted position, and the movable assembly 22 is positioned at the first photographing position, such that the photographic film F is exactly placed on the image forming plane, defined by the photographing optical system (12). Namely, as long as the photographic film F is interposed between the first and second subassemblies 22A and 22B, the movable assembly 22 is at the first photographing position, as shown in the respective halves (a) and (a) of FIGS. 4 and 5, whereby an optical objective image, obtained through the photographing optical system, is formed and focused on the photographing film F.

On the other hand, when the photographing film F is not interposed between the first and second subassemblies 22A and 22B, the electrical current is applied to the solenoid 54 in the reverse direction, so that the plunger 52 is moved from the retracted position to the projected position.

Thus, as shown in the respective lower halves (b) and (b) of the FIGS. 4 and 5, the movable assembly 22 is moved toward the gutter 20, until the rectangular frame member 24 of the first subassembly 22A resiliently abuts the four positioning pins 56, due to the urging force of the four compressed coil springs 42 being smaller than the urging force of the leaf spring 44, whereby the movable assembly 22 is a positioned at the second photographing position such that the image-sensing area of the CCD image sensor 38 is exactly placed on the image-forming plane defined by the photographing optical system of the lens barrel 12. Namely, as long as the photographic film F is not interposed between the first and second subassemblies 22A and 22B, the movable assembly 22 remains at the second photographing position, whereby an optical objective image, obtained through the photographing optical system, is formed and focused on the image-sensing area of the CCD image sensor 38.

In short, the selective positioning of the movable assembly 22 at either the first photographing position or the second photographing position can be ensured by selectively driving the solenoid actuators 46.

In order to determine whether the movable assembly 22 is exactly and properly positioned at either the first photographing position or the second photographing position, by the selective driving of the solenoid actuators 46, the hybrid camera is provided with four detector switches (SW1, SW2, SW3 and SW4) 60, which are arranged adjacent to the positioning pins 56, respectively, and each of which may comprise a contact switch. Note, one of the detector switches 60 is not visible due to the existence of the rectangular frame member 24.

As long as the movable assembly 22 is at the first photographing position, the detector switches 60 remain in an OFF state. On the other hand, when the movable assembly 22 is moved from the first photographing position to the second photographing position, the detector switches 60 are turned ON. Of course, as long as the movable assembly 22 is at the second photographing position, the detector switches 60 remain in an ON state.

As mentioned above, due to the application and halting of the electrical current to the solenoid 54 in the ordinary direction, the plunger 52 remains at the retracted position. Nevertheless, for example, when the camera body 10 is subjected to external impacts, the plungers 52 may forcibly removed from the retracted position regardless of the magnetic attraction of the permanent magnet 50. In this case, the movable assembly 22 may drifted from the first photographing position, due to the resultant urging force derived from the leaf spring 44. If all of the plungers 52 are forcibly removed from the retracted position, the movable assembly 22 will tend to drift from the first photographing position to the second photographing position.

Also, dust, dirt and other particulate matter, penetrating the camera body, may frequently adhere to moving parts of the movable assembly 22. In this case, a smooth movement of the movable assembly 22 may be impaired, affecting the precise and correct positioning of the movable assembly 22 at the first photographing position and/or the second photographing position.

Accordingly, it is always necessary to confirm, via the detector switches (SW1, SW2, SW3 and SW4) 60, whether the movable assembly 22 is exactly and properly positioned at either the first photographing position or the second photographing position.

As shown in FIG. 2, a film sensor 62, such as a photo-reflector, a contact switch or the like, is securely attached to the rear surface of the rectangular frame member 24 of the first subassembly 22A. The film sensor 62 determines whether the photographing film F is interposed between the first subassembly 22A and the second subassembly 22B. For example, when the film sensor 62 detects the existence of the photographing film F, it outputs a high level signal, and, when the film sensor 62 does not detect the existence of the photographing film F, it outputs a low level signal.

Figure 6:
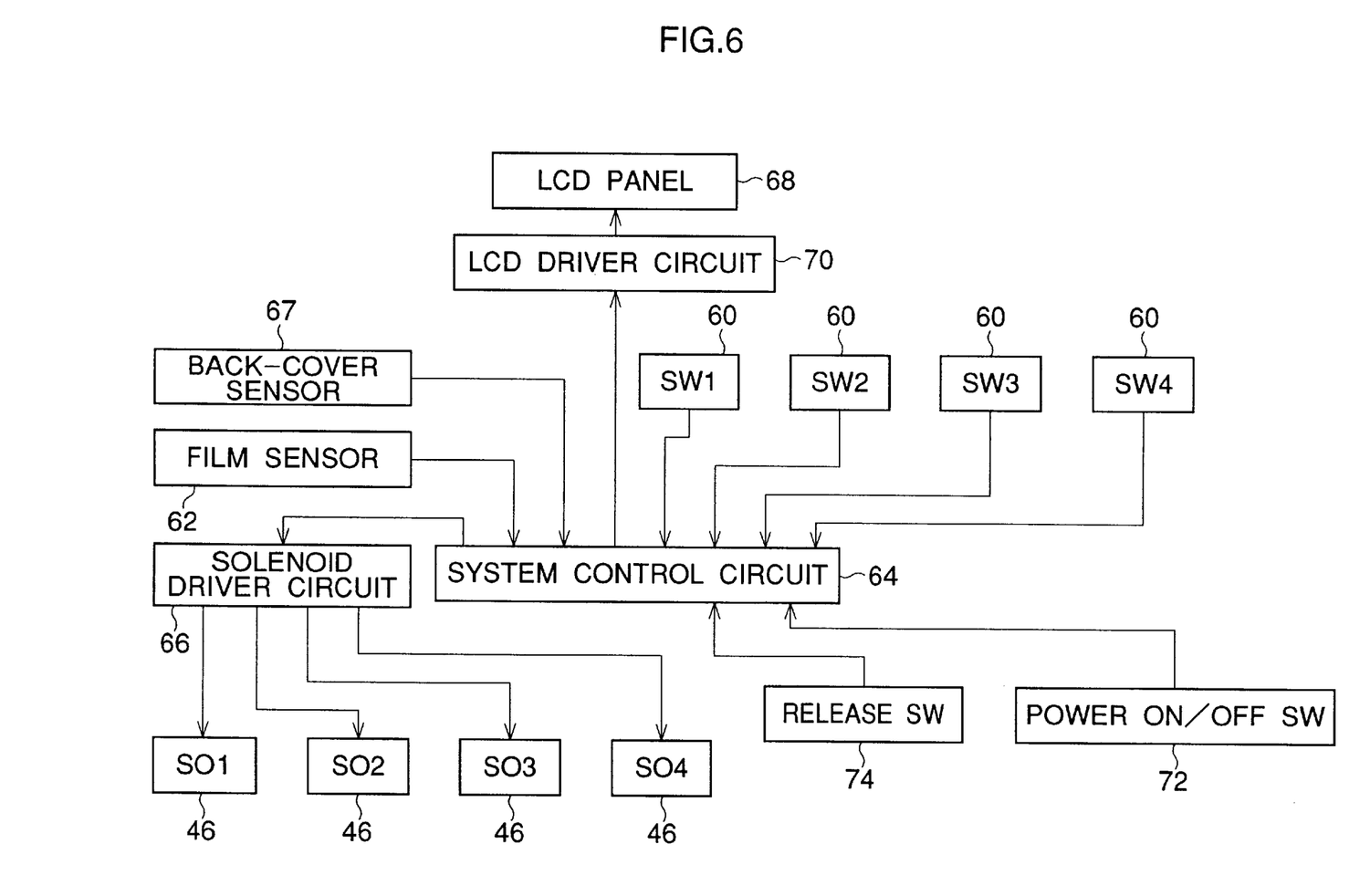
FIG. 6 is a block diagram of the hybrid camera.

FIG. 6 shows a block diagram of the hybrid camera as mentioned above. In this block diagram, reference numeral 64 indicates a system control circuit, which includes a central processing unit (CPU), a read-only memory (ROM) for storing programs, constants, etc., a random access memory (RAM) for storing temporary data, et, and an input/output interface (I/O), to control the hybrid camera as a whole.

The system control circuit 64 drives the four solenoid actuators (SO1, SO2, SO3 and SO4) 46 through a solenoid driver circuit 66. Also, an ON/OFF signal from each of the detector switches (SW1, SW2, SW3 and SW4) 60 and a signal from the film sensor 62 are inputted to the system control circuit 64.

In FIG. 6, reference numeral 67 indicates a back-cover sensor for determining whether the releasable back-cover 13 is open or closed. When the releasable back-cover 13 is closed, the back-cover sensor 67 outputs a low level signal to the system control circuit 64, and, when the releasable back-cover 13 is open, the back-cover circuit 64 outputs a high level signal to the system control circuit 64.

Also, reference numeral 68 indicates an LCD (liquid crystal display) panel provided at, for example, a top of the camera body 10. The LCD panel 68 is connected to the system control circuit 64, via an LCD driver circuit 70, to display various settings of the camera, suitable messages and so on. Further, reference numerals 72 and 74 indicate a power ON/OFF switch and a release switch, respectively. Of course, when the power ON/OFF switch 72 is manually turned ON, a power ON signal is outputted to the system control circuit 64, and, when the release switch 74 is manually turned ON, a release signal is outputted to the system control circuit. 64, to initiate a photographing operation.

Figure 7:
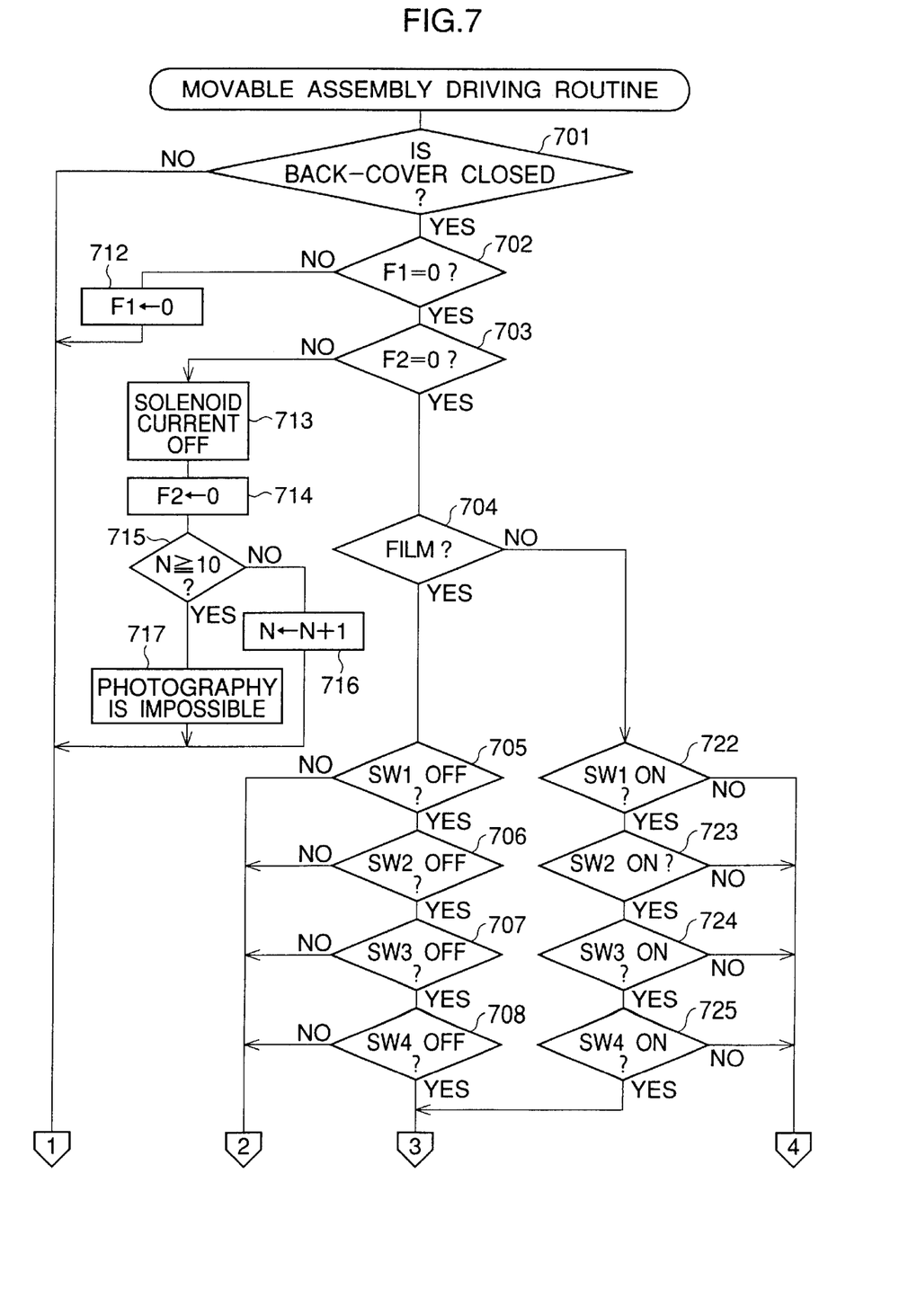
FIG. 7 is a part of a flowchart showing a movable-assembly-driving routine executed in a system control circuit shown in FIG. 6.
Figure 8:
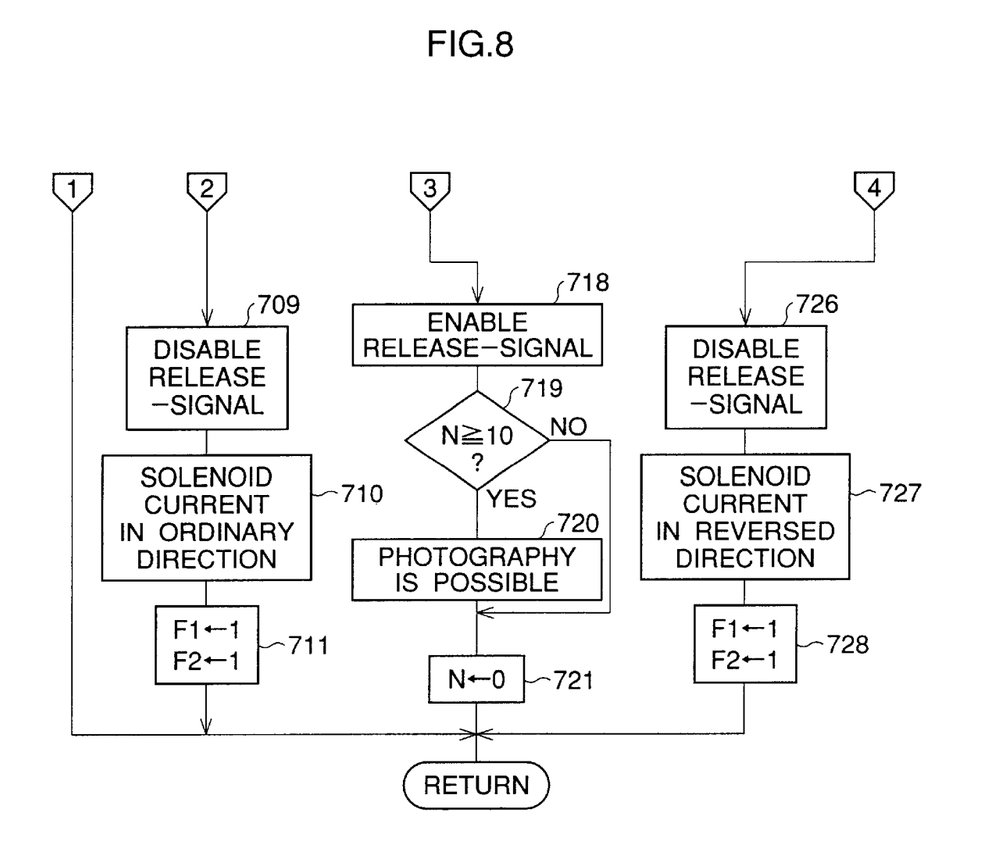
FIG. 8 is the remaining part of the flowchart showing the movable-assembly-driving routine.

FIGS. 7 and 8 show a flowchart of a movable-assembly-driving routine for controlling a movement of the movable assembly 22. The routine is a time interruption routine executed in the system control circuit 64 at regular time intervals of, for example, 200 ms, and an execution of the routine is started by turning ON the power ON/OFF switch 72.

At step 761, it is determined whether the back-cover is closed, i.e. it is determined whether a level of the signal, retrieved from the back-cover sensor 67, is low or high. When the back-cover is open, i.e. when the signal is high, the routine is ended. Thereafter, the execution of the routine is repeated at intervals of 200 ms, with no further progress until the back-cover 13 is closed.

At step 701, when it is confirmed that the back-cover is closed, i.e. the signal from the back-cover sensor 67 is changed from the high level to the low level, the control proceeds to step 702, in which it is determined whether a flag F1 is "0" or "1". At the initial stage, since F1=0, the control proceeds step 703, in which it is determined whether a flag F2 is "0" or "1". At the initial stage, since F2=0, the control proceeds to step 704, in which it is determined whether the photographic film F is interposed between the first and second subassemblies 22A and 22B, i.e. it is determined whether a level of the signal, retrieved from the film sensor 62, is high or low.

When, at step 704, the existence of the photographic film F is confirmed as being interposed between the first and second subassemblies 22A and 22B, it is determined whether all of the detector switches (SW1, SW2, SW3 and SW4) 60 are turned OFF or ON (steps 705 to 708).

If one or more of the detector switches 60 is turned ON, thereby indicating that the movable assembly 22 is incorrectly positioned at the first photographing position, the control proceeds to step 709, in which the release switch 74 is disabled. Namely, although the release switch 74 may have been operated, the release signal, outputted to the system control circuit 64, is disabled, so as to remain OFF. Then, the control proceeds to step 710, in which the solenoid actuators (SO1, SO2, SO3 and SO4) 46 are electrically energized, such that the electric current flows through each of the solenoids 54 in the ordinary direction. Subsequently, at step 711, each of the flags F1 and F2 is set to "1" and the routine is ended.

When the routine is re-executed after the elapsed time of 200 ms, the control proceeds from step 702 to step 712 (F1=1), in which the flag F1 is reset to "0". Thus, the routine is again ended. When the routine is re-executed after the elapsed time of 200 ms, the control proceeds from step 703 to step 713 (F1=0; F2=1), in which the electric current, flowing through each solenoid 54 in the ordinary direction, is halted, thus deenergizing the solenoid actuators (SO1, SO2, SO3 and SO4) 46. Namely, the electrical energizing of the solenoid actuators 46 continues for a period of 400 ms.

At step 714, the flag F2 is reset to "0". Then, at step 715, it is determined whether a count number of a counter N has reached 10. At the initial stage, since N=0, the control proceeds from step 715 to step 716, in which the count number of the counter N is incremented by 1. Thus, the routine is ended.

When the routine is re-executed after the elapsed time of 200 ms, it is again determined whether all of the detector switches (SW1, SW2, SW3 and SW4) 60 are turned OFF or ON (steps 705 to 708). Irrespective of the electrical energizing of the solenoid actuators 46, if all of the detector switches 60 are not turned OFF, the solenoid actuators (SO1, SO2, SO3 and SO4) 46 are again electrically energized, such that the electric current flows through each of the solenoids 54 in the ordinary direction (step 710). Similarly, after a time of 400 ms has elapsed, the solenoid actuators 46 are deenergized, and the count number of the counter N is incremented by 1 (step 716).

Namely, once the electrical energizing of the solenoid actuators 46 has been repeated ten times, i.e. the count number of the counter N reaches 10, if all of the detector switches (SW1, SW2, SW3 and SW4) 60 are not turned OFF, the control proceeds from step 715 to step 717, in which a message, announcing that photography is impossible, is displayed on the LCD panel 68.

On the other hand, when all of the detector switches (SW1, SW2, SW3 and SW4) 60 are turned OFF, regardless of the count number of the counter N, the release switch 74 is enabled (step 718). Namely, by turning ON the release switch 74, it is possible to record an optical objective image on the photographing film F. Then, at step 719, it is determined whether the count number of the counter N is greater than or equal to 10. If N<10 the control skips from step 719 to step 721, in which the count N is reset.

Although the count number of the counter N may reach 10, the electrical energizing of the solenoid actuators (SO1, SO2, SO3 and SO4) 46 is repeated at intervals of 200 ms from the discontinuation of the electric current, as long as the power ON /OFF switch 72 is turned ON and at least one of the detector switches (SW1, SW2, SW3 and SW4) 60 is turned ON. At steps 705 to 708, if all of the detector switches (SW1, SW2, SW3 and SW4) 60 are turned OFF and the count number of the counter N has reached 10, the control proceeds from step 719 to step 720, in which a message, announcing that photography is possible, is displayed on the LCD panel 68. Namely, the message, announcing that the photographing operation is prohibited, is replaced by a message indicating that the photographing operation may proceed at the photographer's discretion.

When, at step 704, the existence of the photographic film F is not confirmed as being interposed between the first and second subassemblies 22A and 22B, it is determined whether all of the detector switches (SW1, SW2, SW3 and SW4) 60 are turned ON or OFF (steps 722 to 725).

If one or more of the detector switches 60 is turned OFF, thereby indicating that the movable assembly 22 is incorrectly positioned at the second photographing position, the control proceeds to step 726, in which the release switch 74 is disabled. Namely, although the release switch 74 may have been operated, the release signal, outputted to the system control circuit 64, is disabled, so as to remain OFF. Then, the control proceeds to step 727, in which the solenoid actuators (SO1, SO2, SO3 and SO4) 46 are electrically energized, such that the electric current flows through each of the solenoids 54 in the reverse direction. Subsequently, at step 728, each of the flags F1 and F2 is set to "1" and the routine is ended.

When the routine is re-executed after the elapsed time of 200 ms, the control proceeds from step 702 to step 712 (F1=1), in which the flag F1 is reset to "0". Thus, the routine is again ended. When the routine is re-executed after the elapsed time of 200 ms, the control proceeds from step 703 to step 713 (F1=0; F2=1), in which the electric current, flowing through each solenoid 54 in the reverse direction, is halted, thus deenergizing the solenoid actuators (SO1, SO2, SO3 and SO4) 46. Namely, the electrical energizing of the solenoid actuators 46 continues for a period of 400 ms.

At step 714, the flag F2 is reset to "0". Then, at step 715, it is determined whether a count number of a counter N has reached 10. At the initial stage, since N=0, the control proceeds from step 715 to step 716, in which the count number of the counter N is incremented by 1. Thus, the routine is ended.

When the routine is re-executed after the elapsed time of 200 ms, it is again determined whether all of the detector switches (SW1, SW2, SW3 and SW4) 60 are turned ON or OFF (steps 722 to 725). Irrespective of the electrical energizing of the solenoid actuators 46, if all of the detector switches 60 are not turned ON, the solenoid actuators (SO1, SO2, SO3 and SO4) 46 are again electrically energized, such that the electric current flows through each of the solenoids 54 in the reverse direction (step 726). Similarly, after a time of 400 ms has elapsed, the solenoid actuators 46 are deenergized, and the count number of the counter N is incremented by 1 (step 716).

Namely, once the electrical energizing of the solenoid actuators 46 has been repeated ten times, i.e. the count number of the counter N reaches 10, if all of the detector switches (SW1, SW2, SW3 and SW4) 60 are not turned ON, the control proceeds from step 715 to step 717, in which a message, announcing that photography is impossible, is displayed on the LCD panel 68.

On the other hand, when all of the detector switches (SW1, SW2, SW3 and SW4) 60 are turned ON, regardless of the count number of the counter N, the release switch 74 is enabled (step 718). Namely, by turning ON the release switch 74, it is possible to record an optical objective image on the image-sensing area of the CCD image sensor 38. Then, at step 719, it is determined whether the count number of the counter N is greater than or equal to 10. If N<10, the control skips from 719 to step 721, in which the counter N is reset.

Although the count number of the counter N may reach 10, the electrical energizing of the solenoid actuators (SO1, SO2, SO3 and SO4) 46 is repeated at intervals of 200 ms from the discontinuation of the electric current, as long as the power ON/OFF switch 72 is turned ON. At steps 722 to 725, when it is confirmed that all of the detector switches (SW1, SW2, SW3 and SW4) 60 are turned ON and the count number of the counter N has reached 10, the control proceeds from step 719 to step 720, in which a message, announcing that photography is possible, is displayed on the LCD panel 68. Namely, the message, announcing that the photographing operation is prohibited, is replaced by a message, indicating that the photographing operation may proceed at the photographer's discretion.

As is apparent from the foregoing, according to the present invention, it is possible to automatically and reliably select either to record the optical objective image on the photographic film F or to record the optical image on the CCD image sensor 38, without the involvement of any burdensome manual manipulation.

Finally, it will be understood by those skilled in the art that the foregoing description is of preferred embodiments of the device, and that various changes and modifications may be made to the present invention without departing from the spirit and scope thereof.

The present disclosure relates to subject matter contained in Japanese Patent Application No. 9-101026 (filed on Apr. 3, 1997) which is expressly incorporated herein, by reference, in its entirety.

What is claimed is:

1. A hybrid camera selectively using either a photographic film or a photoelectric-conversion-type image sensor to record an incidental optical objective image, obtained through a photographing optical system, said hybrid camera comprising:

a movable assembly which is shiftable along an optical axis, defined by said photographing optical system, between a first photographing position and a second photographing position, said movable assembly carrying said photographic film and said photoelectric-conversion-type image sensor; and a driver which selectively drives said movable assembly such that said movable assembly is positioned at either said first photographing position or said second photographing position, wherein an image-recording area of said photographic film is placed on an image-forming plane, defined by said photographing optical system, when said movable assembly is positioned at said first photographing position by said driver, and an image-sensing area of said photoelectric-conversion-type image sensor is placed on the image-forming plane of said photographing optical system when said movable assembly is positioned at said second photographing position by said driver.

2. A hybrid camera as set forth in claim 1, wherein said movable assembly includes a constrainer for constraining a movement of said photographic film at a given location with respect to said movable assembly, and a transparent pressure-plate on-which the constrained photographic film is placed against a surface of said transparent pressure-plate.

3. A hybrid camera as set forth in claim 2, wherein said transparent pressure-plate is formed of a transparent glass material exhibiting an infrared-radiation-shielding characteristic.

4. A hybrid camera as set forth in claim 1, wherein said movable assembly comprises a first subassembly and a second subassembly which are associated with each other; said first subassembly includes a constrainer constraining said photographic film at a given location with respect to said first subassembly, and said second subassembly includes a transparent pressure-plate on which the constrained photographic film is placed against a first surface of said transparent pressure-plate, the image-sensing area of said photoelectric-conversion-type image sensor being in contact with a second surface of said transparent pressure-plate, said second surface being opposite to said first surface.

5. A hybrid camera as set forth in claim 4, wherein said transparent pressure-plate is formed of a transparent glass material exhibiting an infrared-radiation-shielding characteristic.

6. A hybrid camera as set forth in claim 4, further comprising:

a first resilient device resiliently biasing said first subassembly against said second subassembly; and a second resilient device resiliently biasing said second subassembly against said first subassembly, whereby said photographic film is resiliently pressed against the first surface of said transparent pressure-plate.

7. A hybrid camera as set forth in claim 6, wherein an urging force of said first resilient device is smaller than an urging force of said second resilient device, such that the movable assembly is resiliently biased toward said first photographing position, whereby the positioning of said movable assembly at the first photographing position by said driver is assisted by said second resilient device.

8. A hybrid camera as set forth in claim 1, further comprising a film sensor sensing an existence of said photographic film, wherein said driver drives said movable assembly so as to be positioned at said first photographing position when the existence of said photographic film is sensed by said film sensor, and wherein said driver drives said movable assembly so as to be positioned at said second photographing position when the existence of said photographic film is not sensed by said film sensor.

9. A hybrid camera as set forth in claim 1, further comprising a determiner for determining whether or not said movable assembly is exactly and properly positioned at either said first photographing position or said second photographing position, wherein a photographing operation is disabled when it is determined by said determiner that the positioning of said movable assembly at either said first photographing position or said second photographing position is irregular.

10. A hybrid camera as set forth in claim 9, further comprising a display device for displaying a message which indicates that the photographing operation is prohibited when it is determined by said determiner that the positioning of said movable assembly at either said first photographing position or said second photographing position is irregular.

11. A hybrid camera as set forth in claim 1, wherein said driver comprises at least one solenoid actuator including a plunger associated with said movable assembly, the plunger of said solenoid actuator being selectively driven between a first operative position and a second operative position; and wherein said movable assembly is positioned at said first photographing position when said plunger is at said first operative position, and said movable assembly is positioned at said second photographing position when said plunger is at said second operative position.

* * * * *